July 23, 1935. C. E. PARKER 2,008,725
CULINARY MOLD
Filed Dec. 1, 1933
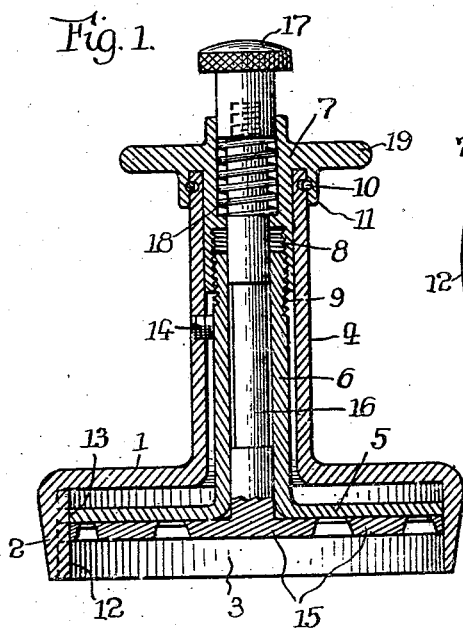
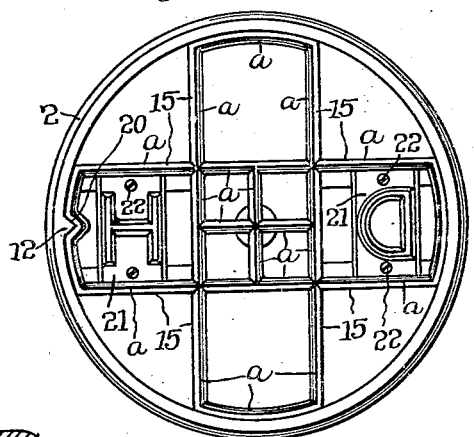
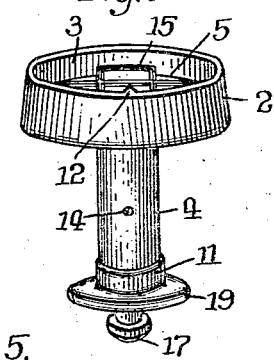
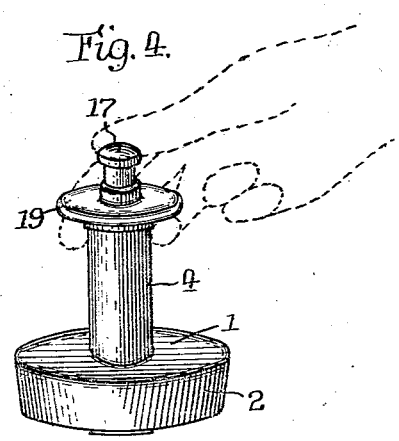
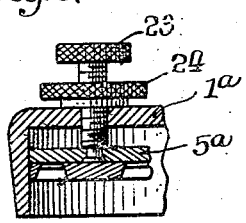
Inventor:
Claude E. Parker,
By Churchill Parker & Carlson
Attys Patented July 23, 1935

2,008,725

UNITED STATES PATENT OFFICE 2,008,725

CULINARY MOLD

Claude E. Parker, Chicago, Ill., assignor of one-third to William W. Rosebro and one-third to Louis J. Krensky, both of Chicago, Ill.

Application December 1, 1933, Serial No. 700,425

5 Claims. (Cl. 107—19)

This invention relates to an improved mold for shaping ground meat to form hamburgers, salmon cakes, aspic, and other plastic food materials. Among the salient objects of the invention are to provide improved means whereby the molded article may be readily ejected from the mold chamber and disengaged from the apparatus, means for adjusting the capacity of the mold so that the size of the molded article may be varied at will, means for causing the molded article to be impressed with any desired design, and in general to provide a simple, inexpensive and efficient implement for the purposes stated.

In the accompanying drawing,

Figure 1 is a longitudinal sectional view of an implement embodying the features of my invention.

Fig. 2 is a bottom side view.

Fig. 3 is a perspective view of the implement in position to be filled with the desired material.

Fig. 4 is a perspective view showing the operation of ejecting a molded article.

Fig. 5 is a fragmental sectional view showing an alternative method of adjusting the capacity of the mold chamber.

The particular embodiment of the invention which I have chosen for illustration herein comprises a mold consisting of the wall 1 and the perimetral wall or rim 2 defining a mold chamber 3. Herein the mold chamber is shown as being circular in outline, but it will be understood that it may be square, oblong, octagonal, or of any other desired outline. Connected to the wall 1 is a tubular stem 4 which forms a handle for the implement.

In order that the capacity of the mold chamber 3 shall be variable, I provide means herein shown as a circular false bottom 5. Attached to the false bottom 5 is a tubular stem 6 which extends into the handle 4 and is connected to suitable means for adjusting the false bottom toward and away from the wall 1. The means herein shown for thus adjusting the false bottom comprises a nut 7 having internal threads 8 which engage external threads 9 on the stem 6. The nut 7 is connected in any preferred manner to the handle 4 to permit of rotation of the nut with relation to the handle while preventing movement of the nut longitudinally of the handle. The means herein shown for this purpose comprises a split ring 10 lying partly within a circular groove in the flange 11 of the nut and partly within a complementary groove in the handle.

Any desired means may be employed to prevent the false bottom 5 from turning when the nut 7 is rotated to adjust the capacity of the mold. The means herein shown for this purpose comprises a rib 12 on the peripheral wall of the mold chamber 3, said rib engaging slidably in a groove 13 in the periphery of the false bottom.

After the false bottom has been adjusted to the desired position, it may be held against accidental movement by any desired means, as, for example, a set screw 14 seated in the handle 4 and bearing against the tubular stem 6.

Means is provided to disengage the molded article from the false bottom 5 and the peripheral wall of the chamber 3. For this purpose I have shown a stripper or ejector 15 in the nature of a grid or open framework. While this grid or framework may partake of various forms, I have herein shown a cruciform grid adapted to lie in contact with the false bottom 5 and extend from side to side of the chamber 3. It will be seen that when the mold chamber 3 is filled with plastic material the ejector 15 will impress upon one side of the molded article a design corresponding to the shape of the ejector. The latter may be of any desired outline and interior arrangement so as to impart to the molded article a design having artistic or advertising value, provided only that the ejector grid or framework shall have a relatively small area of contact with the molded article as compared with the contact between the molded article and the false bottom 5, and provided the over-all dimensions of the ejector are sufficient to disengage the molded article from the false bottom.

By reference to Fig. 2 it will be noted that the grid or ejector 15 consists principally of relatively narrow bars $a$ which are tapered in cross-section, as indicated in Figs. 1 and 2, thus insuring that while the superficial extent of the grid is sufficient to enable it to separate the molded article from the false bottom, the grid has but little area of contact with the molded article.

The means herein shown for moving the ejector to discharge the molded article comprises a plunger 16 connected centrally to the ejector 15 and extending through the tubular stem 6, said stem serving to guide the plunger 16. The plunger also extends through the nut 7 and is provided with a head 17. The nut 7 is recessed to provide space for an expansive spring 18 that surrounds the plunger 16 and lies between the head 17 and the end wall of the recess. The nut 7 has a peripheral flange 19 which affords a finger-hold to permit the thumb to be used to depress the head 17 against the force of the spring 18 when a molded article is to be ejected from the chamber 3.

The periphery of the ejector 15 is herein shown as having a groove 20 to accommodate the rib 12.

In use, the false bottom 5 is adjusted so that the hamburger or other article to be molded shall be of the desired thickness. The operator, holding the implement in the position shown in Fig. 3, then fills the cavity 3 with the ground material and levels it off flush with the peripheral rim 3 by means of a spatula. The operator then inverts the implement into the position shown in Fig. 4 and operates the plunger 16 to eject the molded article onto the cooking surface or other desired support. It will be observed that the ejection of the molded article requires the use of only one hand, thus expediting operations and promoting cleanliness.

In restaurants and other eating places where hamburgers are prepared and served, it is the common practice to mold the hamburgers in the hand or by means of crude implements which allow for considerable variations in the size of the hamburgers. It being impossible for the proprietor to standardize the size of hamburgers served at his establishment, the cost of the meat entering into the item cannot be controlled and very substantial losses are incurred. Moreover, the variations in size of the hamburgers tend to create dissatisfaction on the part of patrons.

It will be evident that the implement herein shown permits of standardization, not only of the size of the article, but of its shape, thus permitting of the production of hamburgers or the like which shall conform in size and shape to buns, sandwiches or other articles with which they may be associated.

The implement also enables any desired design, initials or name, associated with the establishment in which the implement is used, to be impressed upon the molded article. To illustrate this feature of the invention, I have shown in Fig. 2 the initials D and H, these initials being mounted upon initial-bearing plates 21 which are removably secured to the ejector 15 by means of screws or other fasteners 22. It will be understood that any desired initials or the like may be substituted for those shown in Fig. 2.

Fig. 5 illustrates an alternative means for adjusting the false bottom. In that figure 5ª designates the false bottom, 23 is a screw seated in the wall 1ª of the mold chamber and rotatably connected to the false bottom 5ª, and 24 is a lock nut on the screw 23 to hold the latter in adjusted position.

It will be seen that I have provided a simple, inexpensive mold which may be readily filled and emptied and which, by insuring uniformity in size and shape and imparting a pleasing design to the articles, makes the product more attractive whether used in the home kitchen or in public eating places, and effects important economies in commercial establishments.

In one of the appended claims I have used the term "design element" to denote an initial, monogram, symbol or the like.

I claim as my invention:

1. A culinary mold comprising a structure forming a mold chamber, an ejector within the chamber, and formed of an open framework consisting of relatively slender bars affording a relatively slight area of contact with the molded article to prevent sticking of the latter to the ejector, a design element detachably secured to the framework, and means for operating the ejector.

2. A culinary mold comprising a structure forming a mold chamber, a tubular handle on said structure, a false bottom in the mold chamber, a tubular stem attached to the false bottom and extending into the tubular handle, an ejector adapted to lie in contact with the false bottom and formed of a grid or open framework consisting of relatively slender bars affording a relatively slight area of contact with the molded article to prevent sticking of the latter to the ejector, a stem connected to the ejector and extending into said tubular stem, means for adjusting the position of the false bottom, and means for actuating the ejector.

3. A culinary mold comprising a structure forming a mold chamber, a tubular handle on said structure, a false bottom in the mold chamber, a tubular stem attached to the false bottom and extending into the tubular handle, an ejector adapted to lie in contact with the false bottom and formed of a grid or open framework consisting of relatively slender bars affording a relatively slight area of contact with the molded article to prevent sticking of the latter to the ejector, a stem connected to the ejector and extending into said tubular stem, a thumb piece connected to the ejector stem and extending beyond the end of the handle, a nut connected to the end of the handle for rotation with relation to the handle, but held against movement longitudinally of the handle, said nut having projecting portions affording finger holds, a screw-thread connection between said nut and said tubular stem, and a spring tending to hold the ejector in contact with the false bottom.

4. A culinary mold comprising a mold chamber having a tubular handle, a false bottom in the mold chamber, having a tubular stem extending within the tubular handle, an ejector in the chamber, having a plunger extending through the tubular stem, and a nut forming a finger hold rotatably mounted on the upper end of the handle and forming a guide for the upper end of the plunger and having a threaded engagement with the upper end of the tubular stem to adjust the position of the false bottom.

5. A culinary mold as in claim 4, and a spring confined in the nut and bearing against the plunger to lift the latter.

CLAUDE E. PARKER.